(12) United States Patent
Funaoka et al.

(10) Patent No.: US 8,012,356 B2
(45) Date of Patent: Sep. 6, 2011

(54) METHOD FOR SEPARATING AND RECOVERING LIGNIN DERIVATIVES

(75) Inventors: Masamitsu Funaoka, Tsu (JP); Mitsuru Aoyagi, Tsu (JP)

(73) Assignee: Japan Science and Technology Agency, Kawaguchi (JP)

( * ) Notice: Subject to any disclaimer, the term of this patent is extended or adjusted under 35 U.S.C. 154(b) by 30 days.

(21) Appl. No.: 11/921,788

(22) PCT Filed: Jun. 6, 2006

(86) PCT No.: PCT/JP2006/311263
§ 371 (c)(1),
(2), (4) Date: Dec. 7, 2007

(87) PCT Pub. No.: WO2006/132199
PCT Pub. Date: Dec. 14, 2006

(65) Prior Publication Data
US 2009/0209739 A1    Aug. 20, 2009

(30) Foreign Application Priority Data
Jun. 7, 2005 (JP) .................................. 2005-167103

(51) Int. Cl.
- B01D 15/04 (2006.01)
- C02F 1/28 (2006.01)
- C07G 1/00 (2006.01)
- C08L 97/00 (2006.01)

(52) U.S. Cl. .......................... 210/691; 530/500; 530/502

(58) Field of Classification Search .................. 530/500, 530/502; 210/691
See application file for complete search history.

(56) References Cited

U.S. PATENT DOCUMENTS

| 6,420,533 B1 * | 7/2002 | Lightner ......................... 530/500 |
| 6,632,931 B1 * | 10/2003 | Funaoka ......................... 530/502 |
| 6,841,660 B1 * | 1/2005 | Funaoka ......................... 530/502 |
| 2002/0177199 A1 | 11/2002 | Hames et al. |
| 2002/0190003 A1 * | 12/2002 | Hames ........................... 210/691 |
| 2005/0154194 A1 * | 7/2005 | Funaoka ......................... 530/502 |
| 2006/0035392 A1 * | 2/2006 | Funaoka et al. ................... 438/12 |
| 2008/0051566 A1 * | 2/2008 | Ohman et al. .................... 530/500 |
| 2008/0125544 A1 * | 5/2008 | Yao .............................. 525/54.4 |
| 2009/0061230 A1 * | 3/2009 | Berkei et al. ................. 428/402.24 |
| 2009/0209739 A1 * | 8/2009 | Funaoka et al. .................. 530/502 |

FOREIGN PATENT DOCUMENTS

| JP | A 02-233701 | 9/1990 |
| WO | WO 2001/077031 A2 | 10/2001 |
| WO | WO 2004070868 A1 * | 8/2004 |

OTHER PUBLICATIONS

Masamitsu Funaoka et al., "Lignocellulose-Junkangata Kino Zairyo to Shiteno Atarashii Tenkai," Cellulose Commun., Mar. 1, 2005, vol. 12, No. 1, pp. 2-7.
Mitsuru Aoyagi et al., "Shinrin Shigen Yurai Kobunshi Lignophenol no Denshi Zairyo Eno Oyo," The Society of Polymer Science, Japan Nenji Taikai Yokoshu, May 10, 2005, vol. 54, No. 1, p. 1943, 2Pb146.
Mitsuru Aoyagi et al., "Tennen Lignin Yudotai Lignophenol—Sanka Titan Hikari Zokan Taiyo Denchi no Kaihatsu," The Chemical Society of Japan Koen Yokoshu, 2004, vol. 84, No. 2, p. 716, 2B2-11.
Mitsuru Aoyagi et al., "Nano Ryushi Sanka Titan o Mochiita Sobunrikei Henkan System ni Okeru Lignophenol no Shinki Kaishuho," The Society of Chemical Engineers, Japan Nenkai Happyo Koen Yoshishu, Feb. 28, 2006, vol. 71, p. 609, 0114.
Mitsuru Aoyagi et al., "Nano Ryushi Sanka Titan ni yoru Lignophenol Seisei Process no Kaizen," The 14$^{th}$ Polymer Material Forum Yoshishu, Nov. 1, 2005, p. 195, 2PA26.
Mitsuru Aoyagi et al., "Sanka Titan Nano Ryushi o Mochiita Lignophenol no Shinku Kaishuho," Polymer Preprints, Japan, Sep. 5, 2005, vol. 54, No. 2, p. 5366, 2Pc139.
English-language translation of Chinese Office Action in Chinese Patent Application No. 200680020306.7, mailed May 12, 2010.
European Search Report for European Application No. 06 75 7003, mailed Feb. 11, 2011.

* cited by examiner

*Primary Examiner* — Mark Eashoo
*Assistant Examiner* — Liam J Heincer
(74) *Attorney, Agent, or Firm* — Oliff & Berridge, PLC (57) ABSTRACT

An object of the present invention is to provide a technique for separation/collection of a lignin derivative which is useful for the separation of a lignin derivative having a 1,1-diphenylpropane unit and/or a unit derived from the 1,1-diphenylpropane unit from a mixture system containing the lignin derivative. In the Present invention, a lignin derivative having a 1,1-diphenylpropane unit and/or a unit derived from the 1,1-dipheylpropane unit is allowed to contact with a metal oxide in a liquid medium, thereby separating the lignin derivative in the form retained on the metal oxide.

18 Claims, 5 Drawing Sheets

Fig.1

Fig.2 ortho-position binding unit para-position binding unit

METHOD FOR SEPARATING AND
RECOVERING LIGNIN DERIVATIVES

FIELD OF THE INVENTION

This invention relates to separation, recovery, and produce of a lignin derivative with a 1,1-diphenylpropane unit obtainable by introducing a phenol compound to the basic unit of lignin, phenylpropane unit and/or a unit derivative obtainable by introducing modifications and alternation into a 1,1-diphenylpropane unit.

BACKGROUND ART

Lignins are present in the form of lignocelluloses in the plant bodies by complexation with celluloses and have the second largest reserve after celluloses as the carbon resource existing on the globe. At present, lignins are mainly produced as the by-products in the pulp producing process. There are various lignins, for example, lignin acetate and sulfolignin, according to the variety of pulping processes. These lignins have the chemical structures of decomposition and/or polycondensation of natural lignins with introduction of sulfonic acid and other relevant components. Because of the irregularly and significantly modified structures, the lignins have extremely limited applications, for example, dispersant or binder of cement.

The lignins as the important carbon resource having the second largest reserve after celluloses are recyclable and recoverable. It is thus highly demanded to separate the lignins in readily usable forms from lignocellulose materials. One proposed method disclosed in Japanese Patent Laid-Open No. H02-233701 separates lignin from a lignocellulose material while keeping the structural regularity of the lignin. This method contacts a lignocellulose material solvated in advance with a phenol compound with a concentrated acid to release the lignin from the lignocellulose material while preventing the lignin structure in the lignocellulose material from being significantly modified by the concentrated acid. This method introduces the phenol compound into a specific site of a phenylpropane unit as the basic skeleton of the lignin to produce a 1,1-diphenylpropane unit, and gives a low-molecular phenol derivative of the lignin (hereafter referred to as the lignophenol derivative) by cleavage of β-aryl ether linkage.

Several methods have been examined for separation of the lignophenol derivative from the reaction system by taking advantage of the low solubility of the lignophenol derivative in water. One method adds water to the reaction system to recover the lignophenol derivative as precipitate. Another method neutralizes the reaction system with addition of an alkali and extracts the lignophenol derivative. The precipitation-based separation process preferably adopts natural sedimentation for recovery of a maximum possible amount of the lignophenol derivative, but this requires a high volume of water and a number of processing steps. Another disadvantage of this process is failed recovery of a water-dissolved fraction of the lignophenol derivative. The alkali neutralization-based separation process, on the other hand, requires a high volume of water and has problems of gelation control and remaining cations.

In a purification process with an organic solvent, the lignophenol derivative is precipitated for purification in a nonpolar solvent, such as diethyl ether or hexane. There may, however, be a dissolved fraction of the lignophenol derivative in the nonpolar solvent. The nonpolar solvent with a low boiling point is not suitable for high-volume processing and has difficulty in recovery and reuse of the dissolved fraction of the lignophenol derivative in the nonpolar solvent. Evaporation is generally adopted for recovery of the lignophenol derivative from the organic solvent. This causes the problems of energy cost, safety, and disposal.

Various chemical modifications allow for the lignophenol derivative. Similar problems arise in separation and recovery of reaction products after such chemical modifications or in recovery of the lignophenol derivative from various lignophenol derivative-containing composite materials.

It would thus be demanded to provide a technique of effectively separating and recovering a lignin derivative with a 1,1-diphenylpropane unit and/or a unit derived from the 1,1-diphenylpropane unit from a lignin derivative-containing mixing system. There would be a demand for readily separating, producing, purifying, and recovering the lignin derivative from the lignin derivative-containing mixing system. There would also be a demand for efficiently separating, producing, purifying, and recovering the lignin derivative from the lignin derivative-containing mixing system. There would also be a demand for separating, producing, purifying, and recovering the lignin derivative from the lignin derivative-containing mixing system while restricting diffusion of an organic solvent. There would further be a demand for separating, producing, purifying, and recovering the lignin derivative from the lignin derivative-containing mixing system suitable for scaling-up.

The inventors of the present invention have found selective retention of the lignin derivative on a metal oxide in a lignin derivative-containing mixing system and completed the present invention to satisfy at least one of the above requirements by utilizing the metal oxide as a separating material of the lignin derivative as described below.

An aspect in accordance with the present invention provides a method for separating a lignin derivative comprising the step of contacting the lignin derivative with a metal oxide in a liquid medium and separating the metal oxide carrying the lignin derivative, wherein the lignin derivative having a 1,1-diphenylpropane unit and/or the unit derived from the 1,1-diphenylpropane unit.

In the separation method of the invention, the metal oxide may be the oxide of one or more metals selected from the group consisting of titanium, zinc, iron, cobalt, nickel, copper, tin, indium, lead, and niobium. Preferably, the metal oxide comprises a titanium oxide. Further, the metal oxide may comprise a semiconductor material. The metal oxide may comprise a metal oxide particle of average particle size of not greater than 300 nm.

Further, in the separation method of the invention, the liquid medium can be selected from the group consisting of aqueous medium, non-aqueous medium and mixture thereof and the lignin derivative may be dissolved or dispersed in the liquid medium.

Still further, in the separation method of the invention, the lignin derivative can be one or more selected from the group consisting of following (a) to (d):

(a) a ligno-phenol derivative which is an phenol-derivative of lignin obtainable by solvating a lignin containing material with a phenol compound and then mixing the solvated lignin containing material with acid.

(b) a secondary derivative obtainable by introducing the ligno-phenol derivative a group selected from the group comprising acyl group, carboxy group, amido group, and cross-linking group.

(c) a secondary derivative obtainable by treating the lignophenol derivative with an alkali, and (d) a higher order derivative obtainable by modifying the ligno-phenol derivative with at least two modifications selected from the following modifications:
introduction of acyl group, introduction of carboxy group, introduction of amido group, introduction of cross-linking group and alkali-treatment.

Preferably, the lignin derivative comprises the lignin derivative (a), the lignin derivative (b), or the lignin derivative (c).

Further, the separation method further comprises the step of separating and recovering the lignin derivative from the metal oxide.

Another aspect in accordance with the present invention provides a method for producing a lignin derivative comprising the step of contacting the lignin derivative with a metal oxide in a liquid medium and thereby separating the metal oxide carrying the lignin derivative, wherein the lignin derivative having a 1,1-diphenylpropane unit and/or the unit derived from the 1,1-diphenylpropane unit.

In the method of the invention, the lignin derivative can be the ligno-phenol derivative which is a phenol-derivative of lignin in a reaction medium obtainable by solvating a lignin containing material with a phenol compound and then mixing the solvated lignin containing material with acid. Further the separating step may comprise steps of producing the ligno-phenol derivative in a reaction medium obtainable by solvating a lignin containing material with a phenol compound and thereafter contacting the ligno-phenol derivative with the metal oxide and thereby separating the metal oxide carrying the lignin derivative.

Still another aspect in accordance with the present invention provides a method of purifying a lignin derivative comprising the step of contacting the lignin derivative with a metal oxide in a liquid medium and thereby separating the metal oxide carrying the lignin derivative, wherein the lignin derivative having a 1,1-diphenylpropane unit and/or the unit derived from the 1,1-diphenylpropane unit.

Another aspect in accordance with the present invention provides a method for producing a lignin derivative comprising the step of performing one or more modifications to the lignin derivative carried by the metal oxide, the modifications are selected from the following modifications, introduction of acyl group; introduction of carboxy group; introduction of amido group; introduction of cross-linking group; and alkali-treatment, wherein the lignin derivative having a 1,1-diphenylpropane unit and/or the unit derived from the 1,1-diphenylpropane unit. In the method of the invention, the modification can be performed to the lignin derivative carried on the metal oxide. Further, the modification steps keep the modified lignin derivative on the metal oxide.

Another aspect in accordance with the present invention provides a method for recovering a lignin derivative from a composite material containing thereof, comprising the step of contacting the lignin derivative with a metal oxide in a liquid medium and thereby separating the metal oxide carrying the lignin derivative, wherein the lignin derivative having a 1,1-diphenylpropane unit and/or the unit derived from the 1,1-diphenylpropane unit. In the method of the invention, the composite material may comprise a used product.

Still another aspect in accordance with the present invention provides a support for separation of a lignin derivative comprises a metal oxide.

BEST MODES OF CARRYING OUT THE INVENTION

One aspect of the invention pertains to a separation method of a lignin derivative, which has a separation step of contacting a lignin derivative having a 1,1-diphenylpropane unit and/or a derived unit thereof with a metal oxide in a liquid medium to make the lignin derivative carried on the metal oxide and separating the lignin derivative carried on the metal oxide from the liquid medium. A producing method of the lignin derivative and a recovery method of the lignin derivative according to other aspects of the invention include this separation step.

The separation step in the separation method causes the lignin derivative included in the liquid medium to be carried on a solid phase of the metal oxide. The lignin derivative is thus readily separable from the liquid medium not by any special technique like solvent distillation but by a conventional solid-liquid separation technique, for example, centrifugation, natural sedimentation, or filtration. The lignin derivative carried on a stationary phase of the metal oxide is also readily separable from the liquid medium. This ensures easy recovery of even the fractions of the lignin derivative that are conventionally not recoverable by the separation and recovery technique utilizing the different solubilities in a solvent or the variation in particle density. The separation step also enables separation and recovery of the lignin derivative without requirement a high volume of a solvent. This separation step desirably saves the energy consumed for separation and recovery of the lignin derivative and reduces the environmental load.

The separation step enables both a dissolved fraction of the lignin derivative in the liquid solvent and a non-dissolved but dispersed fraction of the lignin derivative to be carried on the metal oxide for separation. This ensures effective recovery of even the fractions of the lignin derivative that are conventionally not easily recoverable.

The lignin derivative according to one aspect of the invention has a linear configuration and a 1,1-diphenylpropane unit and/or a derived unit thereof, which is obtained by introduction of a phenol compound into an a position of a phenylpropane unit as the basic skeleton of lignin, although this structure is not restrictive. The lignin derivative according to this aspect of the invention has the properties different from those of the conventional industrial lignins, such as sulfolignin, as anionic polymers. Exposure of the lignin derivative to the metal oxide is expected to make the lignin derivative carried on the surface of the metal oxide and form a surface or interfacial state of discouraging dispersion of the metal oxide in the liquid medium. This may be the reason for easy separation of the lignin derivative with the metal oxide from the liquid medium.

The particles of the metal oxide (solid phase) with the lignin derivative carried thereon have the aggregation tendency. The metal oxide particles added to the liquid medium containing the lignin derivative immediately precipitate with an explicit change of the properties of the liquid medium. The particles of the metal oxide, for example, white titanium oxide, are colored and precipitate, while the color of a solution of the lignin derivative is changed from the colored state representing dissolution of lignin to the colorless state. The particles of the metal oxide with the lignin derivative carried thereon are mutually attracted rather than repelled and tend to aggregate. The function of the metal oxide for separation of the lignin derivative is not characteristic of the particle form but is similarly achieved in any of other suitable forms, for example, in the form of a filter or in the form of a column filled with the particles of the metal oxide. The lignin derivative is transferred to a solid phase of the metal oxide or a solid phase including the metal oxide, regardless of the form of the metal oxide.

A carrier for separation of the lignin derivative according to another aspect of the invention has a metal oxide as an element of carrying the lignin derivative. The carrier for separation enables the lignin derivative to be carried on the metal oxide in the liquid medium. The lignin derivative is thus separable from the liquid medium by separation of the metal oxide from the liquid medium.

Another aspect of the invention pertains to a producing method of a lignin derivative-containing composite material, which has a step of forming a composite material including a metal oxide with the lignin derivative carried thereon, where the lignin derivative has a diphenylpropane unit and/or a unit derived from the diphenylpropane unit. This producing method makes the lignin derivative carried on the surface of the metal oxide and thereby forms a composite material of the lignin derivative and the metal oxide.

As the best modes of carrying out the invention, the lignin derivative and the metal oxide are described first. The description then sequentially regards the separation method of the lignin derivative, the producing method of the lignin derivative, the purification method of the lignin derivative, the recovery method of the lignin derivative, the producing method of the lignin derivative-containing composite material, and the carrier for separation of the lignin derivative.

(Lignin Derivative)

The lignin derivative according to one aspect of the invention has a 1,1-diphenylpropane unit and/or a unit derived from the 1,1-diphenylpropane unit. Typical examples of the lignin derivative are lignophenol derivatives with a 1,1-diphenylpropane unit and their modified compounds. The 1,1-diphenylpropane unit of the lignophenol derivative includes a phenol compound having a carbon atom at an ortho position or a para position relative to a phenolic hydroxyl group grafted with a carbon atom at a benzyl position (C1 position on the side chain, hereafter simply referred to as the C1 position) of a phenylpropane unit as the basic skeleton of the lignin. The lignophenol derivatives and variety of their modified compounds are described in detail below.

(Lignophenol Derivative)

Figure 1:
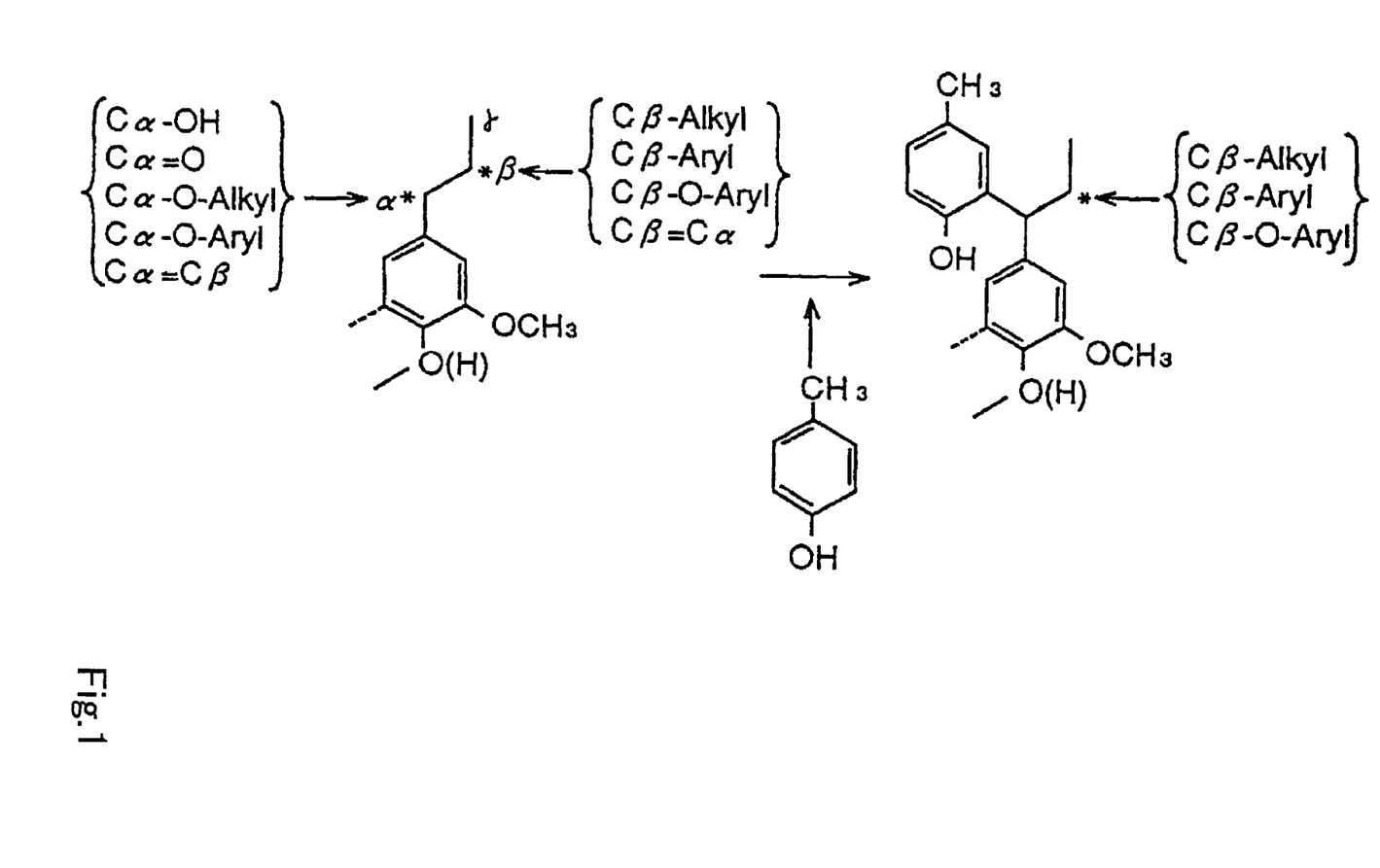
FIG. 1 shows an example of structural conversion of a lignocellulose material containing natural lignin with a phenylpropane unit by phase separation with a phenol compound, p-cresol.

The lignophenol derivative has the 1,1-diphenylpropane unit as mentioned above and may additionally have a phenylpropane unit as the basic skeleton of lignin. The 1,1-diphenylpropane unit of the lignophenol derivative is obtained by linkage of a carbon atom at the ortho position or the para position relative to a phenolic hydroxyl group of the phenol compound with a carbon atom at the C1 position of the phenylpropane unit as the basic skeleton of the starting material lignin. This reaction is shown in FIG. 1. The phenol compound is selectively introduced into the C1 position of the phenylpropane unit. This selective introduction cleaves various bonds at the C1 position of the phenylpropane unit of the lignin to reduce the diversity and the molecular weight of the lignin. The selective introduction also adds novel properties to the lignin, such as solubilities in various solvents and thermal mobility, as is known in the art.

Figure 2:
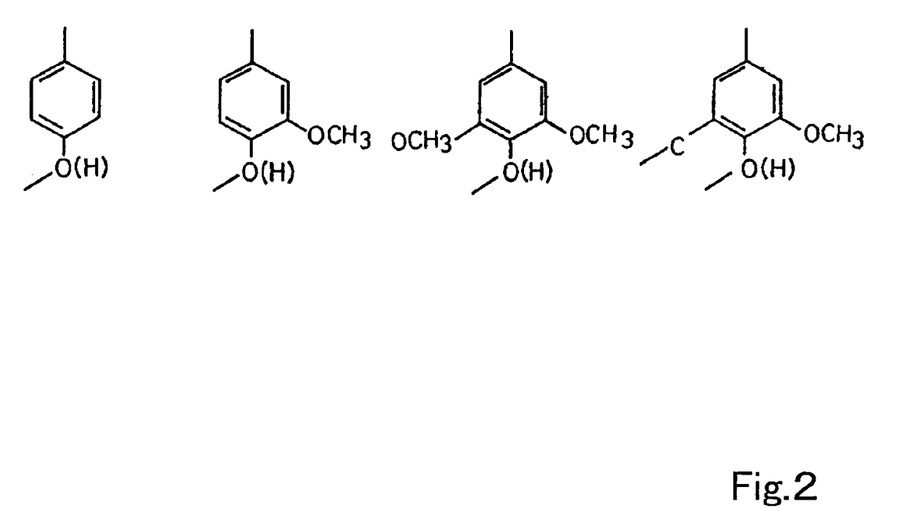
FIG. 2 shows various forms of phenylpropane units in natural lignins.

The separated and purified lignophenol derivative generally has the explicitly different properties including the appearance (color) and the solubility from those of the conventional industrial lignin. The different properties may be ascribed to introduction of the phenol compound and the polymer structure of the lignophenol derivative. The lignophenol derivative is generally obtained from a natural material, for example, a lignocellulose material. The amount and the molecular weight of the phenol compound introduced into the lignophenol derivative depend upon the lignin structure and the reaction conditions of the lignin-containing material used as the starting material. The lignophenol derivatives accordingly do not necessary have constant properties or characteristics. There are multiple different phenylpropane units as the basic skeleton of lignin as shown in FIG. 2. The basic skeleton of lignin depends upon the plant type as the origin of the lignin. The lignophenol derivatives generally have the following properties and characteristics, although the lignophenol derivative of the invention is not restricted to the lignophenol derivatives of these properties in any sense:

(1) having the weight average molecular weight in a range of 2000 to 20000;
(2) having substantially no conjugates in the molecular structure and extremely pale color, typically, faded pink white powder;
(3) having a coniferous lignocellulose-derived solid-liquid phase transition point of 170° C. and a hardwood lignocellulose-derived solid-liquid phase transition point of 130° C.; and
(4) being readily soluble in methanol, ethanol, acetone, dioxane, pyridine, tetrahydrofuran, and dimethylformamide.

As is known in the art, in the lignophenol derivatives, a phenol compound is introduced into the C1 position via its phenolic hydroxyl group. Many of the lignophenol derivatives also have a phenylpropane unit without a grafted phenol compound.

A preferable method of producing the lignophenol derivative solvates a lignin-containing material with a phenol compound and adds an acid to produce the lignophenol derivative.

(Lignin-Containing Material)

The lignin-containing material may be a natural lignin-containing lignocellulose material. Typical examples of the lignocellulose material include lignified materials, various wood resources such as wood flours and wood chips, and agricultural and industrial wastes from the wood resources, for example, waste wood, mill ends, and waste paper. The type of wood materials used here is not specifically restricted but may be any wood materials including coniferous trees and broadleaf trees. The lignocellulose material may be any of various herbaceous plants and agricultural and industrial wastes from the herbaceous plants. The lignin-containing material is not restricted to the natural lignin-containing lignocellulose materials but may be black liquor as denatured lignin-containing waste fluid obtained by pulping process the lignocellulose material.

The lignin-containing material or the lignin included in the lignin-containing material is solvated in advance with a phenol compound. One available procedure supplies a liquid phenol compound to the lignin-containing material for solvation of the lignin-containing material with the phenol compound. Another available procedure dissolves a liquid or solid phenol compound in an adequate solvent and supplies a solution of the phenol compound to the lignin-containing material. Any procedure may be adopted to enable sufficient exposure of the lignin included in the lignin-containing material to the phenol compound for solvation. An excess amount of the phenol compound may be distilled out after the sufficient exposure of the lignin to the phenol compound. It is desirable to distill away the solvent used for the exposure of the lignin-containing material to the phenol compound. The solvation of the lignin-containing material with the phenol compound may be attained by soaking the lignin-containing material in the liquid phenol compound or by impregnating the lignin-containing material with the liquid or solid phenol compound dissolved in the solvent.

(Phenol Compound)

The phenol compound may be any of monovalent, divalent, and trivalent phenol compounds. Typical examples of the monovalent phenol compound include phenol with or without one or more substituents, naphthol with or without one or more substituents, anthrol with or without one or more substituents, and anthraquinol with or without one or more substituents. Typical examples of the divalent phenol compound include catechol with or without one or more substituents, resorcinol with or without one or more substituents, and hydroquinone with or without one or more substituents. A typical example of the trivalent phenol compound is pyrogallol with or without one or more substituents. The phenol compound used in the invention is one or a mixture of multiple phenol compounds selected among the monovalent, divalent, and trivalent phenol compounds. The monovalent phenol compounds are especially preferable.

The monovalent, divalent, and trivalent phenol compounds may have any substituents but preferably those other than electron-withdrawing groups like halogen atoms; for example, lower alkyl group-containing substituents of 1 to 4 or more preferably 1 to 3 carbon atoms, aryl groups (for example, phenyl group) and other aromatic substituents, and hydroxyl group-containing substituents. The lower alkyl group-containing substituents include lower alkyl groups (for example, methyl group, ethyl group, and propyl group) and lower alkoxy groups (for example, methoxy group, ethoxy group, and propoxy group).

Figure 3:
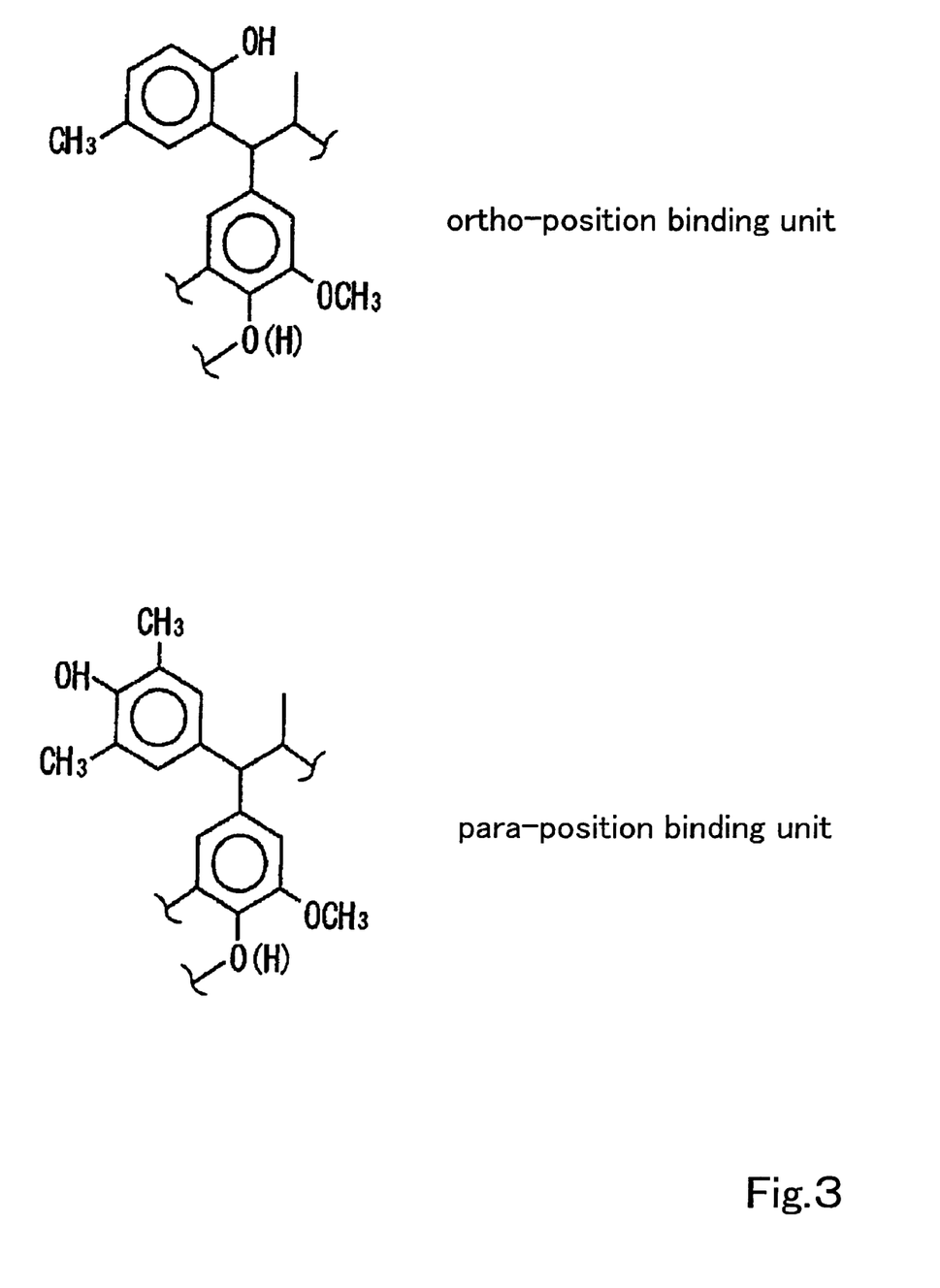
FIG. 3 shows an ortho-position binding unit and a para-position binding unit of lignophenol derivatives.

Binding of a carbon atom at an ortho position or at a para position relative to the phenolic hydroxyl group of the phenol compound to a carbon atom at the C1 position of the phenylpropane unit of the lignin forms the 1,1-diphenylpropane unit. It is preferable that at least one of the ortho positions and the para position relative to the phenolic hydroxyl group preferably has no substituent to ensure at least one introduction site in the phenol compound. As shown in FIG. 3, binding of the carbon atom at the ortho position relative to the phenolic hydroxyl group of the phenol compound to the carbon atom at the C1 position of the phenylpropane unit of lignin forms an ortho-position binding unit. Similarly binding of the carbon atom at the para position relative to the phenolic hydroxyl group of the phenol compound to the carbon atom at the C1 position forms a para-position binding unit The phenol compound used in the invention may be one or multiple phenol compounds selected among non-substituted phenol compounds and various substituted phenol compounds with at least one non-substituted ortho position or a non-substituted para position.

Phenol compounds with at least one non-substituted ortho position (preferably with all non-substituted ortho positions) are used for preparation of the lignophenol derivative having the ortho-position binding unit. Preferably used for the same purpose are phenol compounds with at least one non-substituted ortho position (2-position or 6-position) and with a substituted para position (4-position) (for example, 2,4-substituted monovalent phenol compounds). More preferable are phenol compounds with all non-substituted ortho positions and with a substituted para position (for example, 4-substituted monovalent phenol compounds). One or a combination of 4-substituted phenol compounds and 2,4-substituted phenol compounds may thus be used preferably for preparation of the lignophenol derivative having the ortho-position binding unit.

Phenol compounds with a non-substituted para position (for example, 2-substituted and 6-substituted monovalent phenol compounds) are used for preparation of the lignophenol derivative having the para-position binding unit. Preferably used for the same purpose are phenol compounds with a non-substituted para position and with at least one substituted ortho position (preferably with all substituted ortho positions) (for example, 2,6-substituted monovalent phenol compounds). One or a combination of 2-substituted phenol compounds, 6-substituted phenol compounds, and 2,6-substituted phenol compounds may thus be used preferably for preparation of the lignophenol derivative having the para-position binding unit.

Desirable examples of the phenol compound include p-cresol, 2,6-dimethylphenol, 2,4-dimethylphenol, 2-methoxyphenol (guaiacol), 2,6-dimethoxyphenol, catechol, resorcinol, homocatechol, pyrogallol, and phloroglucinol. Especially preferable is p-cresol for the high introduction efficiency.

(Acid)

The lignin-containing material solvated with the phenol compound may be contacted with any of various inorganic acids and organic acids to produce the lignophenol derivative. Typical examples of the inorganic acid include sulfuric acid, phosphoric acid, and hydrochloric acid, and typical examples of the organic acid include p-toluenesulfonic acid, trifluoroacetic acid, trichloroacetic acid, and formic acid. The acid preferably has the function of sufficiently swelling cellulose when a lignocellulose material is used for the lignin-containing material. The available acids having this function include not lower than 65% by weight of sulfuric acid (more specifically 72% by weight of sulfuric acid), not lower than 85% by weight of phosphoric acid, not lower than 38% by weight of hydrochloric acid, p-toluenesulfonic acid, trifluoroacetic acid, trichloroacetic acid, and formic acid. Especially preferable are not lower than 85% by weight of phosphoric acid (more specifically not lower than 95% by weight of phosphoric acid), trifluoroacetic acid, and formic acid.

Any of diverse methods may be applied to convert lignin included in the lignin-containing material into a lignophenol derivative and to separate the lignophenol derivative. One typical method soaks the lignocellulose material (lignin-containing material) with a liquid phenol compound (for example, p-cresol) for solvation of lignin with the phenol compound and adds an acid (for example, 72% by weight of sulfuric acid) to dissolve the cellulose component of the solvated lignocellulose material. This produces a lignophenol derivative with the phenol compound grafted at the C1 position of the basic structural unit in a phenol compound phase, simultaneously with dissolution to the lower-molecular lignin. The lignophenol derivative is then extracted from the phenol compound phase. The lignophenol derivative is an assembly of lower-molecular lignins obtained by cleavage of the benzyl aryl ether linkage of lignin. In the illustrated example of FIG. 4, the phase separation of natural lignin having the phenylpropane unit gives the lignophenol derivative according to one aspect of the invention.

The lignophenol derivative may be extracted from the phenol compound phase by any of adequate methods. One available method mixes the phenol compound phase with a large excess of ethyl ether for sedimentation and dissolves the collected sediment fraction in acetone. The method then removes an acetone-insoluble fraction by centrifugation, concentrates a remaining acetone-soluble fraction, and adds the concentrated acetone-soluble fraction dropwise to a large excess of ethyl ether for sedimentation. Removal of the solvent from the collected sediment fraction gives the lignophenol derivative. The crude lignophenol derivative may be obtained by simple vacuum distillation of the phenol compound phase or the acetone-soluble fraction.

Another method of preparing the lignophenol derivative soaks the lignin-containing material with a solid or liquid phenol compound dissolved in a solvent (for example, ethanol or acetone) and removes the solvent (sorption of the phenol compound). The obtained lignophenol derivative is extracted and separated with a liquid phenol compound. Still another method mixes a reaction mixture of the lignin-containing material and a phenol compound with a large excess of water, collects an insoluble fraction by centrifugation, and dries the collected insoluble fraction after deacidification. The lignophenol derivative may be extracted by addition of acetone or an alcohol to the dried substance. The acetone- or alcohol-soluble fraction of the dried substance may otherwise be added dropwise to a large excess of ethyl ether. This gives the lignophenol derivative as an insoluble fraction. These methods of preparing the lignophenol derivative are only illustrative and not restrictive in any sense, and may be modified, changed, or altered according to the requirements.

The method disclosed in Japanese Patent Laid-Open No. H02-233701 adopts solvation of lignin with a phenol compound, in combination with structural destruction by swelling of a hydrocarbon with a concentrated acid, to separate the lignocellulose material into the hydrocarbon and a lignophenol derivative while controlling inactivation of the lignin. The general description of lignophenol derivatives and their producing processes is found in International Publication WO99/14223, Japanese Patent Laid-Open No. H09-278904, No. 2001-64494, No. 2001-261839, No. 2001-131201, No. 2001-34233, and No. 2002-105240 (the contents of these patent documents are hereby incorporated by reference into this application).

(Secondary Derivative)

The lignin derivative used in the invention may be a secondary derivative obtained by chemical modification of the lignophenol derivative. The secondary derivative may be any compound derived from the lignophenol derivative, for example, an acyl group-introduced secondary derivative, a carboxyl group-introduced secondary derivative, an amide group-introduced secondary derivative, a crosslinking group-introduced secondary derivative, or a secondary derivative obtained by alkali treatment of the lignophenol derivative.

(Acyl Group-Introduced Secondary Derivative)

The acyl group-introduced secondary derivative has a structure with an RCO— group (acyl group) substituting the hydrogen atom of the phenolic hydroxyl group included in the 1,1-diphenylpropane unit or the phenylpropane unit of the lignophenol derivative. Exposure of the lignophenol derivative to an acylating agent, such as acetic anhydride, gives the acyl group-introduced secondary derivative. Typical examples of the acyl group to be introduced include acetyl group, propionyl group, butyryl group, valeryl group, benzoyl group, toluoyl group. Especially preferable is the acetyl group. Such acylation protects the hydroxyl group. The protection of the hydroxyl group controls the hydroxyl group-based characteristics and may interfere with hydrogen bonding to lower the potential for association. General acylation conditions are applicable to the acylation of the lignophenol derivative. Carboxyl monohalides, such as acetyl chloride, may also be used for acylation.

(Carboxyl Group-Introduced Secondary Derivative)

The carboxyl group-introduced secondary derivative has a structure with a —COOH group (carboxyl group) substituting the hydrogen atom of the phenolic hydroxyl group included in the lignophenol derivative. Exposure of the lignophenol derivative to an acid dihalide (or higher-order halide), for example, an acid dichloride, introduces the carboxyl group simultaneously with esterification of the phenolic hydroxyl group of the lignophenol derivative to give the carboxyl group-introduced secondary derivative. Preferable examples of the acid halide include adipic dichloride, maleic dichloride, and terephthalic dichloride. The esterification with the acid halide is known in the art and is thus not specifically described here. General carboxylation conditions are applicable to the carboxylation of the lignophenol derivative.

(Amide Group-Introduced Secondary Derivative)

The amide group-introduced secondary derivative has a structure with a —CONHR group (amide group) substituting the double bond in the lignophenol derivative or the carboxyl group in the carboxyl group-introduced secondary derivative. In the amide group, R denotes any of lower linear alkyl groups and lower branched alkyl groups of 1 to 5 carbon atoms, and cycloalkyl groups, alkyl aryl groups, and aralkyl groups of 6 to 9 carbon atoms with or without substituents. Introduction of the amide group to the double bond in the lignophenol derivative or to the carboxyl group after the above carboxylation gives the amide group-introduced secondary derivative. Diversity of known amidation conditions and agents are applicable to the amidation of the lignophenol derivative.

(Crosslinking Group-Introduced Secondary Derivative)

The crosslinking group-introduced secondary derivative has a structure with a crosslinking group at the ortho position and/or the para position relative to the phenolic hydroxyl group in the lignophenol derivative. The reaction of the lignophenol derivative with a crosslinking group-forming agent in the dissociation condition of the phenolic hydroxyl group of the lignophenol derivative gives the cross linking group-introduced secondary derivative. Application of an adequate alkali solution attains the dissociation condition of the phenolic hydroxyl group of the lignophenol derivative. The alkali and the solvent used and the concentration of the alkali solution are not specifically restricted, as long as the alkali solution can dissociate the phenolic hydroxyl group of the lignophenol derivative. One typical example is a 0.1N aqueous solution of sodium hydroxide.

The crosslinking group is introducible to the ortho positions and the para position relative to the phenolic hydroxyl group in this dissociation condition. The selection of one or a combination of multiple phenol compounds roughly determines the introduction position of the crosslinking group. The phenol compound with two substituents at both the ortho position and the para position does not allow the crosslinking group to be introduced to the grafted phenol nucleus but introduces the crosslinking group into the phenolic aromatic nucleus of the lignin structure. The phenolic aromatic nucleus of the lignin structure is mainly present at the polymer ends of the lignophenol derivative. A resulting prepolymer accordingly has the crosslinking group introduced at the polymer ends. The phenol compound with only one substituent at the ortho position or at the para position or with no substituent allows the crosslinking group to be introduced to both the grafted phenol nucleus and the phenolic aromatic nucleus of the lignin structure. Introduction of the crosslinking group over the length of the polymer chain as well as the polymer ends gives a multifunctional prepolymer.

The crosslinking group introduced to the lignophenol derivative is not specifically restricted but any group introducible to the phenolic aromatic nucleus of the lignin structure or to the grafted phenol nucleus (aromatic nucleus of the grafted phenol compound). Typical examples of the crosslinking group include hydroxymethyl group, hydroxyethyl group, hydroxypropyl group, and 1-hydroxyvalerylaldehyde. The crosslinking group-forming agent is a nucleophilic compound and forms or keeps crosslinking groups after the reaction with the lignophenol derivative. Available examples of the crosslinking group-forming agent are formaldehyde, acetaldehyde, propionaldehyde, and glutaraldehyde. Formaldehyde is especially preferable for the high introduction efficiency.

The alkali solution containing the mixture of the lignophenol derivative and the crosslinking group-forming agent may be heated according to the requirements to accelerate introduction of the crosslinking group into the aromatic nucleus. The heating condition for the accelerated introduction of the crosslinking group is not specifically restricted but is preferably in a temperature range of 40 to 100° C. The temperature of lower than 40° C. undesirably gives the extremely low reactivity of the crosslinking group-forming agent, whereas the temperature of higher than 100° C. undesirably activates the self reaction of the crosslinking group-forming agent and the side reactions other than the introduction of the crosslinking group into the lignophenol derivative. The heating condition is preferably in a range of 50 to 80° C. and more specifically about 60° C. The introduction of the crosslinking group is stopped, for example, by cooling down the reaction solution. The reaction solution is acidified to pH of about 2, for example, with hydrochloric acid of an appropriate concentration. After the acidification, the acid and the unreacted crosslinking group-forming agent are removed by washing and dialysis of the reaction product. The reaction product is typically freeze dried after the dialysis and may be dried on phosphorus pentoxide under reduced pressure when appropriate.

The crosslinking group-introduced secondary derivative thus obtained has the crosslinking group at the ortho position and/or the para position relative to the phenolic hydroxyl group in the lignophenol derivative. The weight-average molecular weight of the resulting secondary derivative is generally in a range of 2000 to 20000 or more specifically in a range of 2000 to 10000, although these values are not restrictive. The crosslinking group introduced into the lignophenol derivative is generally 0.01 to 1.5 moles/C9 unit.

(Secondary Derivative by Alkali Treatment)

Figure 5:
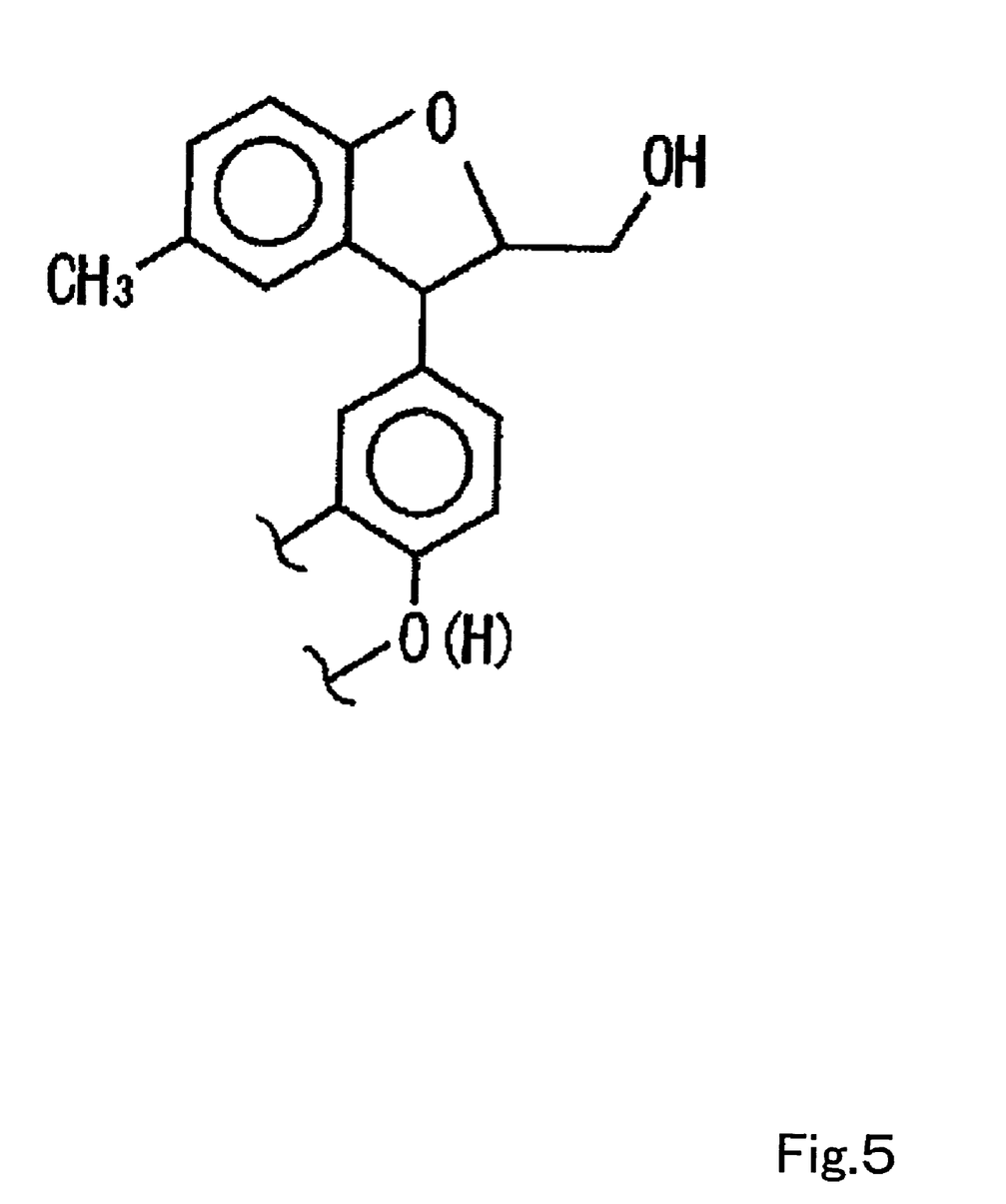
FIG. 5 shows structural conversion of a lignophenol derivative having an ortho-position binding unit by alkali treatment with a phenol compound, p-cresol.

The secondary derivative by alkali treatment typically has an aryl coumaran unit. The aryl coumaran unit has the coumaran skeleton formed by linkage of the phenylpropane unit of lignin at the C1 position with the phenol compound at the ortho position as shown in FIG. 5. Namely the aryl coumaran unit is obtained by structural conversion of the ortho-position binding diphenylpropane unit of the lignin derivative. The secondary derivative by alkali treatment may additionally have one or multiple units selected from a non-structural converted ortho-position binding diphenylpropane unit, a para-position binding diphenylpropane unit, and a para-position binding phenylpropane unit, in addition to the aryl coumaran unit.

Figure 4:
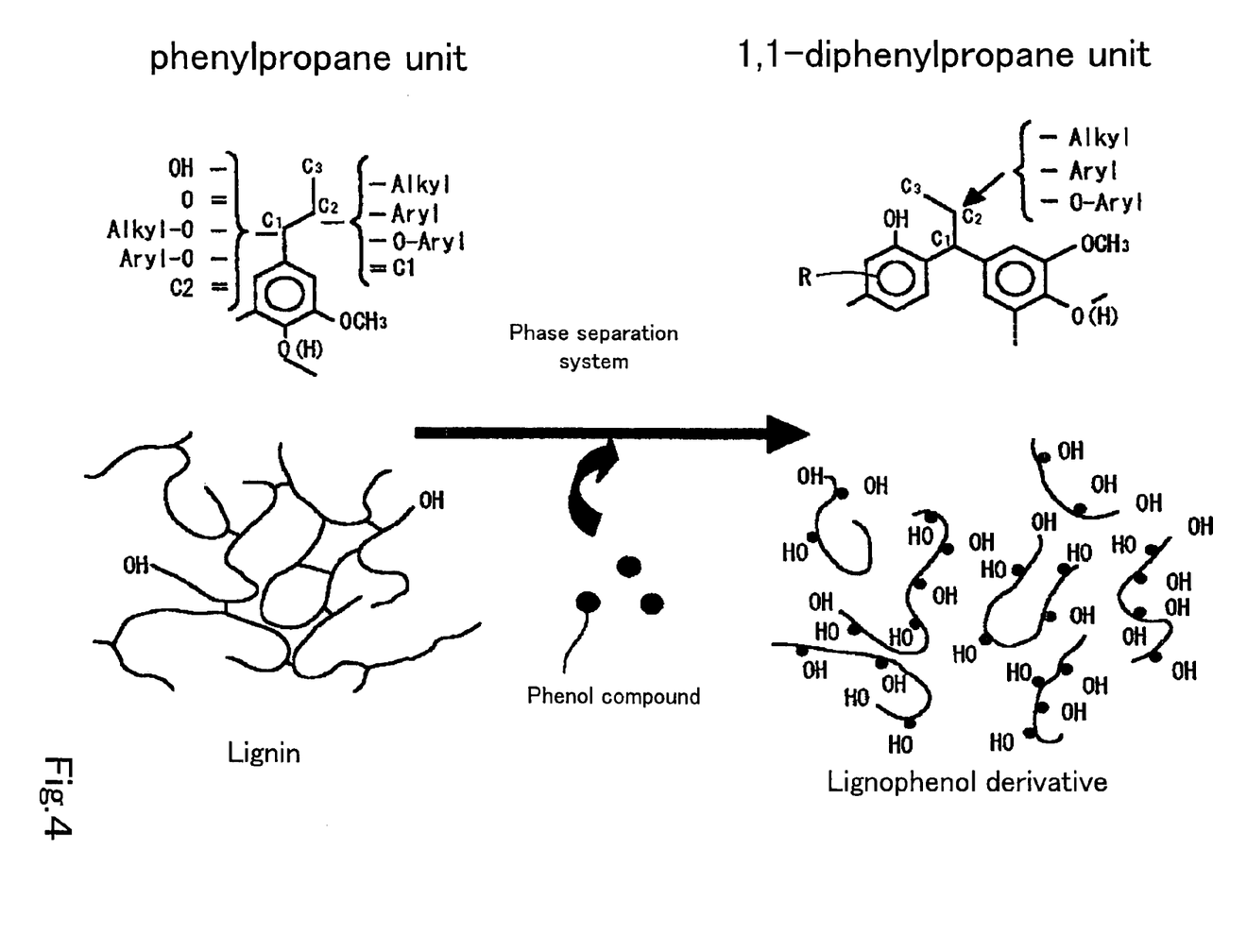
FIG. 4 shows production of a lignophenol derivative obtainable by structural conversion of a lignocellulose material containing natural lignin with a phenylpropane unit by phase separation with a phenol compound.

In the alkali treatment of the lignophenol derivative with the ortho-position binding unit, which has a bond of the carbon atom at the ortho position relative to the phenolic hydroxyl group in the grafted phenol compound to the carbon atom at the C1 position of the lignin structure, the phenoxide ion of the grafted phenol compound attacks the carbon atom at the C2 position of the lignin structure as shown in FIG. 4. The attack of the carbon atom at the C2 position cleaves the C2 aryl ether linkage. The gentle alkali treatment of the lignophenol derivative with the ortho-position binding unit cleaves the phenolic hydroxyl group of the grafted phenol compound as shown in FIG. 4. The phenoxide ion thus produced attacks the C2 position of the C2 aryl ether linkage in an intramolecular nucleophilic manner to cleave the ether linkage to the lower-molecular lignophenol derivative. The cleavage of the C2 aryl ether linkage produces the phenolic hydroxyl group in the lignin structure (see the right dotted circle in FIG. 4). The intramolecular nucleophilic reaction causes the grafted phenol nucleus and the phenylpropane unit of the lignin structure to form the aryl coumaran unit having the coumaran skeleton. This shifts the phenolic hydroxyl group (see the left dotted circle in FIG. 4) of the phenol compound to the lignin structure (see the right dotted circle in FIG. 4). The resulting secondary derivative with this shift has different light absorbing characteristics from those of the original lignophenol derivative.

The alkali treatment contacts the lignophenol derivative with an alkali. A typical procedure of the alkali treatment dissolves the lignophenol derivative in an alkali solution and makes the lignophenol derivative react with the alkali for a preset time period under application of heat when required. Any alkali solution having the function of dissociating the phenolic hydroxyl group of the grafted phenol compound in the lignophenol derivative may be used for the alkali treatment. The alkali and the solvent used and the concentration of the alkali solution are not specifically restricted. Dissociation of the phenolic hydroxyl group in the alkali environment forms the coumaran structure by the neighboring group participation. For example, a sodium hydroxide solution is applicable to the lignophenol derivative with graft of p-cresol. The alkali treatment may contact the lignophenol derivative with an alkali solution having the alkali concentration of 0.5 to 2 N for approximately 1 to 5 hours. Heating the alkali solution facilitates formation of the coumaran structure in the lignophenol derivative. The heating conditions including the temperature and the pressure are not specifically restricted. The alkali solution may be heated to or over 100° C., for example, approximately 140° C., to degrade the lignophenol derivative to the lower-molecular lignophenol derivative. Heating the alkali solution to or over its boiling point under pressure also degrades the lignophenol derivative to the lower-molecular lignophenol derivative.

In the alkali treatment with a fixed alkali solution of a fixed concentration, the higher heating temperature in the temperature range of 120 to 140° C. accelerates the cleavage of the C2 aryl ether linkage to the lower-molecular lignophenol derivative. The higher heating temperature in this temperature range increases the phenolic hydroxyl group derived from the aromatic nucleus of the lignin structure, while decreasing the phenolic hydroxyl group derived from the grafted phenol compound. Regulation of the reaction temperature thus controls the degree of degradation to the lower-molecular lignophenol derivative and the degree of shift of the phenolic hydroxyl group from the grafted phenol compound to the phenol nucleus of the lignin structure. The preferable reaction temperature range is 80 to 140° C. to accelerate the degradation to the lower-molecular lignophenol derivative and the formation of the aryl coumaran structure with the shift of the phenolic hydroxyl group from the C1-position grafted phenol compound to the phenol nucleus of the lignin structure.

The cleavage of the C2 aryl ether linkage by the neighboring group participation of the C1 phenol nucleus in the ortho-position binding unit is accompanied with formation of the aryl coumaran structure as described above. The reaction temperature is, however, not restricted to the optimum temperature (approximately 140° C.) for efficient formation of the aryl coumaran structure. The reaction temperature may be set to a higher value, for example, approximately 170° C., according to the material and the application of the lignophenol derivative. This higher reaction temperature cleaves the coumaran ring to reproduce the phenolic hydroxyl group in the grafted phenol compound, while newly forming conjugates by the change of the molecular structure with the shift of the aryl group. The resulting secondary derivative has different light absorbing characteristics from those of the original lignophenol derivative and those of the secondary derivative with the aryl coumaran structure.

The heating temperature of the alkali treatment is thus adequately settable in a range of 80 to 200° C., although these values are not restrictive. The temperature of extremely lower than 80° C. interferes with the smooth reaction, whereas the temperature of extremely higher than 200° C. accelerates the undesired side-reactions.

One preferable procedure of the alkali treatment for formation of the aryl coumaran structure and the accompanied degradation to the lower-molecular lignophenol derivative contacts the lignophenol derivative with, for example, a 0.5 N aqueous solution of sodium hydroxide as the alkali solution at 140° C. in an autoclave for 60 minutes. These conditions of the alkali treatment are especially preferable for the lignophenol derivative with graft of p-cresol or with graft of 2,4-dimethylphenol. One preferable procedure of the alkali treatment for formation of conjugates contacts the lignophenol derivative with, for example, a 0.5 N aqueous solution of sodium hydroxide as the alkali solution at 170° C. in an autoclave for 20 to 60 minutes.

(Higher-Order Derivative)

The diverse chemical modifications of the lignophenol derivative give the diversity of the secondary derivatives described above. The obtained secondary derivatives may further be subjected to one or multiple chemical modifications, such as the acylation, the carboxylation, the amidation, the introduction of the crosslinking group, and the alkali treatment, to give higher-order lignin derivatives. The resulting higher-order derivative keeps the combined structural characteristics corresponding to the selected combination of the chemical modifications. For example, combination of the alkali treatment with the introduction of the crosslinking group gives a higher-order lignin derivative having the aryl coumaran structure or the new conjugate structure with a crosslinking group introduced at a specific position. Combination of the alkali treatment with a hydroxyl group protecting reaction, such as the acylation, gives a higher-order lignin derivative having the aryl coumaran structure or the new conjugate structure with a hydroxyl group-protecting group, such as the acyl group. Combination of the introduction of the crosslinking group with the hydroxyl group protecting reaction, such as the acylation, gives a higher-order lignin derivative having a crosslinking group introduced at a specific position and a hydroxyl group-protecting group, such as the acyl group.

The diversity of lignin derivatives described above may be exposed to any of various energy irradiations, such as heat rays, light rays, and radiation rays. The energy irradiation accelerates polymerization of the lignin derivative and formation of new conjugates to expand the light absorption range and enhance the optical absorption intensity. The energy irradiation is not specifically restricted but is preferably one or a combination of various heat rays, light rays, radiation rays, and electron rays. The lignin derivative is exposed to the energy irradiation in the separation and extraction process or in the recycle process. The energy irradiation may not aim to increase the conjugates. The metal oxide with the lignin derivative carried on may be the target of the energy irradiation.

(Metal Oxide)

The metal oxide may be any having the function of supporting the lignin derivative in the liquid medium. The metal of the metal oxide is not specifically limited but may be one or a combination selected among typical metals and transition metals. The metal oxide may be a simple metal oxide or a complex metal oxide. Metal oxide semiconductors, for example, titanium oxides, zinc oxides, iron oxides, cobalt oxides, nickel oxides, copper oxides, tin oxides, indium oxides, lead oxides, and niobium oxides, may be used as the metal oxide, although they are not restrictive in any sense. Concrete examples are $TiO_2$, $SnO_2$, $Fe_2O_3$, $ZnO$, $Pb_2O_5$, $PbO$, and $In_2O_3$. Among these examples, $TiO_2$ and $Nb_2O_5$ are preferable and $TiO_2$ is most preferable.

The use of the metal oxide semiconductor, for example, $TiO_2$, gives a lignin derivative-carrying semiconductor, which may be used as a photosensitizer for solar cells.

The form of the metal oxide is not specifically restricted, but may be any of powdery (particulate), granular, sheet, plate, membrane, and variety of other three-dimensional forms. In the membrane form of metal oxide, a metal oxide layer is formed on the surface of an adequate material base. The material base as the carrier of the metal oxide layer may be another metal oxide or a plastic or metal material. The material base may have any suitable form, for example, a granular form or a plate form. The lignin derivative is carried on the surface of the metal oxide in any of the above forms.

In the powdery or particulate form of metal oxide, the particle diameter is not specifically restricted but is determined to enable retention of the lignin derivative included in the lignin derivative-containing mixing system and subsequent separation of the lignin derivative by solid-liquid separation. The desirable average particle diameter is not greater than 500 nm. The metal oxide particles having the average particle diameter of not greater than 500 nm efficiently carry the lignin derivative in the separable form by the solid-liquid separation. The average particle diameter is preferably not greater than 300 nm, specifically not greater than 100 nm, more specifically not greater than 50 nm, and most specifically not greater than 20 nm. The average particle diameter may be measured by the conventional number-based observation with an electron microscope, such as a TEM or an SEM.

The metal oxide may be given as a dense body or a porous body, although the porous structure is preferable. The suitable form of the metal oxide body depends upon its application. The granular form of metal oxide may be used directly or may be charged into a column. The sheet or plate form of metal oxide may be used as a filter.

The phenomenon of making the lignin derivative carried on the surface of the metal oxide has not been fully elucidated yet. This phenomenon may, however, be ascribed to complexation of the lignin derivative with the metal on the surface of the metal oxide or to chemical interaction-based adsorption of the lignin derivative to the surface of the metal oxide. The complexation may be caused by coordination of the oxygen atom in the hydroxyl group of the lignin derivative to the metal atom in the metal oxide. Such assumption or hypothesis does not restrict the characteristics of the invention in any sense.

(Separation Method of Lignin Derivative)

The description regards the separation method of the lignin derivative by using the metal oxide. The separation method of the lignin derivative has a separation step of contacting the lignin derivative with the metal oxide in a liquid medium to make the lignin derivative carried on the metal oxide and separating the lignin derivative carried on the metal oxide from the liquid medium. This separation step is described below in detail.

(Separation Step)
(Liquid Medium)

The liquid medium is not specifically restricted but may be any of aqueous media, non-aqueous media, and mixtures thereof. The liquid medium is adequately selected according to the application of the mixing system (for example, the lignophenol derivative, the secondary derivative, or the higher-order derivative), which requires separation of the lignin derivative, and according to the type and the solubility of the lignin derivative as the target of separation.

The aqueous media are water and a mixture of water and one or more water-soluble organic solvents. Typical examples of the organic solvent include primary alcohols having alkyl groups of 1 to 4 carbon atoms, such as methanol, ethanol, n-propyl alcohol, isopropyl alcohol, n-butyl alcohol, sec-butyl alcohol, and tert-butyl alcohol, acetone, methyl ethyl ketone, dioxane, pyridine, tetrahydrofuran, dimethylformamide, ethylene glycol, glycerin, cellosolves like ethyl cellosolve and methyl cellosolve, and acetonitrile. One or a combination of these organic solvents mixed with water may be used as the aqueous medium.

The non-aqueous media are general organic solvents. The organic solvents include both polar solvents and non-polar solvents. Typical examples of the polar solvent include primary alcohols having alkyl groups of 1 to 4 carbon atoms, such as methanol, ethanol, n-propyl alcohol, isopropyl alcohol, n-butyl alcohol, sec-butyl alcohol, and tert-butyl alcohol, acetone, methyl ethyl ketone, dioxane, pyridine, tetrahydrofuran, dimethylformamide, ethylene glycol, glycerin, cellosolves like ethyl cellosolve and methyl cellosolve, acetonitrile, and phenols. Typical examples of the non-polar solvent include diethyl ether, diisopropyl ether, n-hexane, cyclohexane, benzene, toluene, xylene, and chloroform. One or a combination of these organic solvents may be used as the non-aqueous medium.

The liquid character of the liquid medium is not restricted but is preferably acidic or neutral. This is because higher retention of the lignin derivative on the metal oxide is observed in an acidic to neutral range. The liquid medium preferably has pH of not higher than 8, more preferably pH of not higher than 7, or most preferably pH of not higher than 5. The pH limit in the acidic range is not specifically determined but is preferably not lower than 1 by taking into account adsorption of hydrogen ion to titanium oxide and dissolution of titanium oxide into sulfuric acid included in the mixing system.

Prior to contact with the metal oxide, the lignin derivative may be dissolved in the liquid medium or may be present as colloidal particles or insoluble particles in the liquid medium. The liquid medium containing the lignin derivative as the target of the separation step may be any of a solution of the lignin derivative, a colloid of the lignin derivative, or a suspension (or dispersion) of the lignin derivative. The separation method according to one aspect of the invention enables the lignin derivative contacted with the metal oxide to be carried on the metal oxide, regardless of the state of the lignin derivative.

In the separation step, the lignin derivative is selectively carried on the metal oxide even when the liquid medium includes other soluble and insoluble components. The separation step thus ensures efficient separation of the lignin derivative, irrespective of the coexisting insoluble or soluble components.

The separation step contacts the lignin derivative with the metal oxide in the liquid medium and accordingly makes the lignin derivative carried on the metal oxide. The mixing sequence of the lignin derivative, the liquid medium, and the metal oxide for contacting the lignin derivative with the metal oxide in the liquid medium is not restrictively specified but may be determined optionally to enable the retention of the lignin derivative on the metal oxide. It is, however, preferable to prepare in advance the liquid medium containing the lignin derivative and then contact the liquid medium with the metal oxide. This enables the lignin derivative to be immediately carried on the metal oxide and efficiently separated from the liquid phase. Concrete procedures of contacting the lignin derivative with the metal oxide include:

(1) mixing particles of the metal oxide to a solution or dispersion of the lignin derivative;
(2) making a solution or dispersion of the lignin derivative pass through a porous membrane of the metal oxide or a filter with the metal oxide supported thereon; and
(3) introducing a solution or dispersion of the lignin derivative into a column filled with particles of the metal oxide or a filler with a surface phase of the metal oxide.

The temperature in the separation step is not specifically restricted but may be any temperature that enables the retention of the lignin derivative on the metal oxide. The suitable temperature depends upon the lignin derivative, the metal oxide, and the liquid medium used. The separation step readily proceeds at the temperature of not higher than 100° C. By taking into account the operability, the temperature is preferably not higher than 60° C. and more preferably not higher than 40° C. The lower limit temperature is preferably not lower than 0° C. for the better operability.

The separation step may stir the liquid medium containing the lignin derivative. This may preferably increase the potential for contact of the lignin derivative with the metal oxide.

The metal oxide with the lignin derivative carried thereon is separated by conventional solid-liquid separation techniques, for example, centrifugation, filtration, or natural sedimentation. Since the lignin derivative is carried on the metal oxide, the lignin derivative is readily separated from the liquid medium by solid-liquid separation. The lignin derivative dissolved in a liquid medium of an organic solvent is conventionally recovered by distillation of the solvent. The separation step in the invention enables recovery of the lignin derivative without requiring thermal energy.

Centrifugation is the effective technique for separating the lignin derivative carried on the particles of the metal oxide. The adequate separation technique of the metal oxide depends upon the application form of the metal oxide. In a fixation form of the metal oxide, for example, in the form of a lignin derivative separation column filled with the metal oxide as the filler, the lignin derivative is carried on the filler in the separation column. No special technique is thus required for separation and recovery of the lignin derivative. In the form of a lignin derivative separation filter made of the metal oxide as the filter material, collection of the filter means collection of the metal oxide with the lignin derivative carried thereon.

(Recovery Step)

The separation method of the lignin derivative according to one aspect of the invention may further include a recovery step of the lignin derivative. The recovery step keeps the metal oxide with the lignin derivative carried thereon in an alkaline condition to recover the lignin derivative from the metal oxide. The alkaline condition in the recovery step is not specifically restricted but may be any alkalinity that enables the lignin derivative carried on the metal oxide to be released from the metal oxide. The release of the lignin derivative may be identified according to a variation in amount of the lignin derivative in an alkaline liquid medium and a color change of the alkaline liquid medium and/or decoloration of the metal oxide. The lignin derivative released from the metal oxide is recovered in a dissolved or dispersed form in the alkaline liquid medium.

In the fixation form of the metal oxide, for example, in the form of the lignin derivative separation column, one concrete recovery procedure washes the separation column according to the requirement and supplies an alkaline mobile phase having alkalinity of enabling release of the lignin derivative to the separation column for recovery of the lignin derivative. In the form of the lignin derivative separation filter, one concrete recovery procedure washes the filter material according to the requirement and soaks the filter material in an alkaline liquid medium for recovery of the lignin derivative.

Various alkaline solvents of inorganic alkalis or organic alkalis are usable as the alkaline liquid medium for recovery of the lignin derivative. Available examples of the inorganic alkali include NaOH, KOH, and $NH_4OH$. The organic alkali is, for example, an organic amine, such as triethylamine. NaOH and other inorganic alkalis are preferably used for this purpose. The alkaline liquid medium may have any alkalinity that enables release of the lignin derivative from the metal oxide and any pH higher than 8, which is the upper limit of the acidic to neutral range suitable for retention of the lignin derivative on the metal oxide. The liquid medium may be selected arbitrarily among water, organic solvents, and aqueous solutions of organic solvents. Typical examples of the organic solvent include primary alcohols having alkyl groups of 1 to 4 carbon atoms, such as methanol, ethanol, n-propyl alcohol, isopropyl alcohol, n-butyl alcohol, sec-butyl alcohol, and tert-butyl alcohol, acetone, methyl ethyl ketone, dioxane, pyridine, tetrahydrofuran, dimethylformamide, ethylene glycol, glycerin, cellosolves like ethyl cellosolve and methyl cellosolve, and acetonitrile. One or a combination of these organic solvents may be used as the liquid medium.

The recovery step does not require heating. The lignin derivative is releasable from the metal oxide without heating. In the alkaline condition, heating may cause alkaline degradation as mentioned previously. The temperature in the recovery step is thus preferably not higher than 100° C. unless the alkaline degradation is desired. The temperature of not higher than 100° C. ensures recovery of the lignin derivative while effectively preventing the alkaline degradation. The temperature in the recovery step is preferably not higher than 80° C., more preferably not higher than 60° C., and most preferably not higher than 40° C.

The metal oxide used for the temporary retention of the lignin derivative is reusable after release of the lignin derivative. The used metal oxide may be washed for removal of the remaining surface adsorbate and/or may be fired. The remaining inorganic substances are readily removable by washing the used metal oxide with water, an acid, or an alkali. The remaining organic substances are readily removable by firing the used metal oxide at a sufficiently high temperature, for example, at a temperature of or over 200° C. In the case of the metal oxide having a photocatalytic function, the remaining surface organic substances may be degraded and removed by the photocatalytic function.

(Producing Method of Lignin Derivative)

Another aspect of the invention is a producing method of the lignin derivative including the separation step described above. This producing method enables the lignin derivative to be readily separated from the reaction system. The separation step is performed in the producing method of the lignin derivative, for example, when a synthesis reaction liquid of the lignin derivative is used as the liquid medium containing the lignin derivative.

The separation step can be performed, for example, for an acidic aqueous reaction liquid (containing cellulose) after synthesis of a lignophenol derivative from a lignocellulose material. In the acidic reaction liquid (suspension) having pH in a range of 1 to 4, the lignophenol derivative is partly dissolved in water but is mainly insoluble in water. It is thus required to collect an insoluble fraction of the acidic reaction liquid and extract the lignophenol derivative with an organic solvent. Contact of the acidic reaction liquid with the metal oxide, for example, by adding particles of the metal oxide to the acidic reaction liquid enables the lignophenol derivative in the acidic reaction liquid to be immediately carried on the metal oxide and form yellow precipitate with transparent supernatant. This means that the lignophenol derivative substantially insoluble in the acidic reaction liquid is contacted with and carried on the metal oxide to form precipitate. The metal oxide may be added to the acidic reaction liquid during the synthesis of the lignophenol derivative to a specific extent that does not interfere with separation of lignin in the form of the lignophenol derivative from the lignocellulose material. The lignophenol derivative is then contacted with the metal oxide immediately after the synthesis in the acidic reaction liquid and is transferred from the liquid phase to the solid phase.

The lignin derivative is not restricted to the lignophenol derivative but may be any of various secondary derivatives and higher-order derivatives described previously. For production of the secondary derivative by alkali treatment, the lignophenol derivative is heated in the alkaline condition and is then neutralized for stop of the reaction. The reaction liquid may be contacted with the metal oxide in the course of or after the neutralization. The secondary derivative by the alkali treatment is thus carried on the metal oxide for separation.

In synthesis of the secondary derivative with introduction of the protective group of the phenolic hydroxyl group, for example, acyl group, the secondary derivative can be carried on the metal oxide for separation by contacting the synthesis reaction liquid of the secondary derivative with the metal oxide.

The liquid character, for example, pH, of the reaction liquid is adequately adjusted to a level suitable for the liquid medium in the separation step. The recovery step of the lignin derivative may additionally be performed after the separation step according to the requirement. The recovery step ensures recovery of the lignin derivative in a dissolved or dispersed form in the alkaline liquid medium.

In the producing method of the lignin derivative, the metal oxide may be used not only for separation of the lignin derivative from the lignin derivative-containing mixing system but as the carrier for synthesis of the lignin derivative. The lignin derivative carried on the metal oxide may be subjected to any one or combination of the diverse chemical modifications including the introduction of the acyl group, the carboxyl group, the amide group, and the crosslinking group as the functional groups and the alkali treatment as discussed previously. Contact of the lignin derivative carried on the metal oxide with a specific condition for a selected chemical modification can give the chemically modified lignin derivative as a secondary derivative. This enables successive chemical modifications of the lignin derivative kept on the metal oxide and desirably saves or simplifies relevant operations, such as separation.

The chemical modification step can be performed to give the selected chemical modification to the lignin derivative that is kept on the metal oxide. For example, the lignin derivative carried on the metal oxide may be subjected to the chemical modification, the acylation, the carboxylation, or the amidation. The lignin derivative after the chemical modification can be kept on the metal oxide easily. On the other hand, the alkali treatment is performed in the condition of enabling easy release of the lignin derivative from the metal oxide. The lignin derivative after the alkali treatment is thus readily releasable from the metal oxide. The chemically modified lignin derivative by the alkali treatment is released from the metal oxide and is transferred to an alkali treatment solution. Neutralization of the alkali treatment solution to the acidic to neutral range can stop the alkali treatment and enables the secondary derivative obtained by the alkali treatment to be carried again on the metal oxide.

As one example of the lignin derivative, the lignophenol derivative synthesized from the lignocellulose material and carried on the metal oxide for separation may subsequently be subjected to any of the various chemical modifications to produce the chemically modified lignophenol derivative as a secondary derivative, while being kept on the metal oxide. The metal oxide that is used to carry the lignin derivative for separation and purification of the lignin derivative also goes through the chemical modification. This simplifies the separation step and the purification step of the lignin derivative and facilitates the chemical modification of the lignin derivative. In recovery of the lignin derivative from a used product by utilizing the metal oxide, the lignin derivative may be subjected to a required chemical modification, while being kept on the metal oxide. This facilitates the reuse and the recycle of the lignin derivative. The use of the metal oxide as the carrier for separation of the lignin derivative enables the reuse and recycle of the lignin derivative.

(Purification Method of Lignin Derivative)

Still another aspect of the invention is a purification method of the lignin derivative including the separation step described above. This purification method enables easy recovery of the remaining lignin derivative that is present in a purification solvent even after deposition of the lignin derivative.

The lignin derivative, such as the lignophenol derivative, has the varying solubility in each solvent according to its molecular weight and the introduction amount of the phenol compound. It is accordingly difficult to separate and recover all fractions of the lignophenol derivative in the purification process. Especially full recovery of fractions of the lignophenol derivative dissolved in a non-polar solvent of a low boiling point is extremely difficult, because of the low boiling point of the solvent and the handling and safety restrictions. The conventional procedure of purifying the lignin derivative dissolves the lignin derivative in a selected purification solvent and keeps the purification solvent in a specific condition for deposition of the lignin derivative. In this case, the full content of the lignin derivative may not deposit, but a partial fraction of the lignin derivative may be present in the dissolved state in the purification solvent. Exposure of the purification solvent containing the lignin derivative dissolved therein to the metal oxide enables separation and recovery of the lignin derivative from the purification solvent. The purification method according to one aspect of the invention enables recovery of even a dissolved fraction of the lignin derivative, which is conventionally unrecoverable, and thus ensures the high recovery rate of the lignin derivative.

Contact of an acetone solution of the crude lignophenol derivative with the metal oxide by, for example, adding the metal oxide to the acetone solution causes the lignophenol derivative to be carried on the metal oxide and transferred to the solid phase. In the process of dropwise addition of the acetone solution of the crude lignophenol derivative to diethyl ether to precipitate the lignophenol derivative as an insoluble fraction, part of the lignophenol derivative is still dissolved in the solution mixture of acetone and diethyl ether as the liquid medium. Addition of the metal oxide to the solution mixture of acetone and diethyl ether causes the dissolved lignophenol derivative to be immediately carried on the metal oxide and precipitate. In this manner, even a dissolved fraction of the lignin derivative in the purification solvent, which is conventionally unrecoverable, can be recovered by the exposure of the lignin derivative-containing purification solvent to the metal oxide.

In the purification method of the lignin derivative, typical examples of the solvent for dissolving the lignin derivative include primary alcohols having alkyl groups of 1 to 4 carbon atoms, such as methanol, ethanol, n-propyl alcohol, isopropyl alcohol, n-butyl alcohol, sec-butyl alcohol, and tert-butyl alcohol, acetone, methyl ethyl ketone, dioxane, pyridine, tetrahydrofuran, dimethylformamide, ethylene glycol, glycerin, cellosolves like ethyl cellosolve and methyl cellosolve, acetonitrile, and phenols. One or a combination of these organic solvents or an aqueous solution of one or a combination of these organic solvents may be used as the solvent for dissolving the lignin derivative. Among these organic solvents, acetone is preferable. Typical examples of the solvent for purification of the lignin derivative include diethyl ether, diisopropyl ether, n-hexane, cyclohexane, benzene, toluene, xylene, and chloroform.

In the purification method of the lignin derivative, the recovery step of the lignin derivative may additionally be performed after the separation step according to the requirement. The recovery step ensures recovery of the lignin derivative in a dissolved or dispersed form in the alkaline liquid medium.

(Recovery Method of Lignin Derivative)

Another aspect of the invention is a recovery method of the lignin derivative from any of various lignin derivative-containing products, used products, and other composite materials. The separation step and the recovery step described above may be performed as part of the recovery method of the lignin derivative from the lignin derivative-containing composite materials, products, and used products. The lignin derivative exerts the caking power in the course of softening, fusing, or deposition from the solution and functions as a bonding resin. Various objects and products may thus be formed as the composite materials by utilizing this property of the lignin derivative. The details of such composite materials and their producing processes are described in, for example, Japanese Patent Laid-Open No. H09-278904 and Republished Japanese Translation of PCT International Publication No. 99/014223. Unlike the conventional phenol resins, the lignin derivative is soluble in various organic solvents and aqueous alkali solutions and is recoverable from these composite materials by the alkali treatment to degrade the lignin derivative to the lower-molecular derivative (having, for example, the aryl-coumaran unit).

The recovery method includes an elution step of supplying a solvent for dissolving the lignin derivative to the lignin derivative-containing composite material to elute the lignin derivative in the solvent for dissolution. The elution step may include the alkali treatment of the composite material to degrade the lignin derivative included in the composite material to the lower-molecule derivative simultaneously with the elution in an alkali treatment liquid. For the easy exposure of the lignin derivative to the solvent for dissolution or to the alkali treatment liquid, the composite material containing the lignin derivative may be decomposed in the elution step or may be chopped into small pieces prior to the elution step. The solvent for dissolving the lignin derivative may be any one or combination of methanol, ethanol, acetone, dioxane, pyridine, tetrahydrofuran, and dimethylformamide, an aqueous solution of any one or combination of these organic solvents, or an aqueous alkali solution.

The recovery method may have the separation step that contacts a lignin derivative-containing eluate obtained by the elution step with the metal oxide to make the lignin derivative carried on the metal oxide. Some foreign substances are generally mixed or dissolved in the solvent for eluting the lignin derivative. This enables the selective retention of the lignin derivative on the metal oxide. The lignin derivative is thus readily extractable from the mixing system by separation of the metal oxide from the eluate.

In the recovery method according to one aspect of the invention, the separation step may contact a lignin derivative-containing eluate during elution with the metal oxide to make the lignin derivative carried on the metal oxide. Namely the separation method may be performed in the course of the elution step. The liquid character, for example, pH, of the eluate can be adequately adjusted to a level suitable for the liquid medium in the separation step.

The recovery method of the lignin derivative according to one aspect of the invention enables easy recovery of the lignin derivative from various composite materials and thus ensures efficient reuse and recycle of the lignin.

(Metal Oxide-Containing Carrier for Separation of Lignin Derivative)

Still another aspect of the invention is a metal oxide-containing carrier for separation of the lignin derivative. The metal oxide functions as a material of carrying the lignin derivative and separating and recovering the lignin derivative from the mixing system in various processing steps of the use cycle of lignins in the form of the lignin derivatives. The metal oxide may be used directly in a powdery form or may be supported in an adequate form (for example, granular or membrane) on a carrier in any of various applications, for example, particles, fibers, or sheets.

The metal oxide itself may be used as the carrier for separation of the lignin derivative. The metal oxide prepared in an appropriate form (shape and particle diameter) may thus be directly added to the lignin derivative-containing mixing system. The metal oxide may alternatively be fixed to and supported on an adequate carrier. The resulting metal oxide-supported carrier ensures a sufficient contact area with the lignin derivative, thus enabling efficient separation of the lignin derivative and facilitating solid-liquid separation. This carrier for separation may be used as a column filler and be fixed to and supported on an adequate column. The resulting metal oxide-supported column enables efficient separation of the lignin derivative. One typical form of the carrier is particles of various materials, for example, ceramic, glass, and plastic materials. Any of diverse known techniques may be applied to make the metal oxide supported on such particles. For example, a firing-based membrane formation technique or deposition technique or any of various physicochemical techniques may be adopted to make the metal oxide supported on ceramic or glass particles. The shape of the particles is not specifically restricted but may be spherical, acicular, or amorphous. Another form of the carrier is a tubular body. A tubular body with the metal oxide fixed to its inner wall may directly be used as the carrier for separation of the lignin derivative. One typical example of the tubular body is a plastic, ceramic (for example, silica), or glass capillary.

One typical form of the carrier for separation is a filter with the metal oxide supported thereon. The metal oxide may be supported on the surface of the filter or may be supported to coat or be kneaded in filaments as the filter element. In any of these forms, the metal oxide present on the surface of the filter carries the lignin derivative. The lignin derivative is readily separable and recoverable by simply filtering the liquid medium containing the lignin derivative. The filter may be used alone or may be set in an adequate casing to be used as a filter device.

(Metal Oxide-Containing Carrier for Synthesis of Lignin Derivative)

The carrier for separation of the lignin derivative described above may be used as a carrier for synthesis of the lignin derivative. The metal oxide with the lignin derivative carried thereon may be subjected to various chemical modifications.

As described above, the various aspects of the invention enable easy separation and recovery of the lignin derivative from even the mixing systems conventionally having difficulties in separation and recovery. The technique of the invention thus ensures efficient recycle and reuse of lignin-derived resources included in lignocellulose materials, as well as efficient use of resources of celluloses (including hemicelluloses). The technique of the invention enables the effective use, recycle, and reuse of the lignin-derived resources by desirably restricting the use of the solvents, the consumption of thermal energy, and the diffusion of organic solvents.

EXAMPLES

Some examples of the present invention are described below, although these examples are only illustrative and not restrictive in any sense.

Example 1

Separation of Lignophenol Derivative from Acetone Solution

Acetone-defatted, dried western hemlock powder was used as the lignocellulose material. Western hemlock-ligno-p-cresol was prepared by introducing p-cresol as the phenol compound into the lignin of the lignocellulose material. At room temperature, 0.2 g of titanium oxide particles (ST-01 manufactured by Ishihara Sangyo Kaisha, Ltd., average particle diameter: 7 nm (by x-ray measurement)) was added to 50 ml of an acetone solution of the western hemlock-ligno-p-cresol (2.5 g/L) with magnetic stirring. Immediately after the addition of the titanium oxide particles, yellow precipitate was formed with colorless transparent supernatant. The precipitate was separated from the supernatant by centrifugation of the reaction liquid at 3000 rpm at the temperature of 5° C. Ultraviolet-visible spectroscopy of the supernatant determined that the concentration of the remaining ligno-p-cresol was not higher than 1% (not higher than 0.025 g/L) of its initial concentration (2.5 g/L). Namely the addition of the titanium oxide particles succeeded in separating and recovering at least 99% of the lignophenol derivative from the lignophenol derivative-containing acetone solution.

Example 2

Separation of Lignophenol Derivative from Acidic Aqueous Medium

After addition of 5000 ml of an acetone solution containing 500 g of p-cresol to 1000 g of acetone-defatted, dried western hemlock powder as the lignocellulose material with stirring, the mixture was sealed and stood overnight. The p-cresol-adsorbed wood powder was obtained by stirring the mixture with a glass bar for removal of acetone. A mixture of the whole weight of the p-cresol-adsorbed wood powder and 2 L of 72% sulfuric acid were promptly stirred to lower the viscosity. After a sufficient decrease of the viscosity, the mixture was magnetically stirring in the air atmosphere for one hour at room temperature. The mixture was then added to 20 L of ion exchange water with stirring to give two light-beige acidic reaction liquids having different pHs as dispersions of the western hemlock-ligno-p-cresol particles. These reaction liquids were collected from different stages of the washing step with 20 L of ion exchange water. At room temperature, 5 g of the titanium oxide particles used in Example 1 was added to 200 ml of each of the two acidic reaction liquids. Immediately after the addition of the titanium oxide particles, yellow precipitate was formed with transparent supernatant in each of the reaction liquids. The precipitate was separated from the supernatant by centrifugation of each of the reaction liquids at 3500 rpm at the temperature of 5° C. Addition of 100 ml of a 1N aqueous sodium hydroxide solution to each of the collected precipitates with stirring changed the color of the aqueous solution from colorless to brown, while changing the color of the precipitate from yellow to white. The shift of the color from the precipitate (titanium oxide particles) to the aqueous solution means that the lignophenol derivative was released from the titanium oxide particles and entered into the 1N aqueous sodium hydroxide solution.

Each of the two 1N aqueous sodium hydroxide solutions including the titanium oxide particles was centrifuged for separation of brown supernatant from the titanium oxide particles. Each of the brown supernatants was neutralized with 50 ml of 2N hydrochloric acid to give beige precipitate. The beige precipitate was washed with water and dried to yield western hemlock-ligno-p-cresol. Each of the two white precipitates of the titanium oxide particles collected as pellets from the respective 1N aqueous sodium hydroxide solutions was dried at room temperature. Each of the dried precipitates as pellets was added again to an acetone solution of the western hemlock-ligno-p-cresol (2.5 g/L) to form vivid yellow precipitate. This yellow precipitate was titanium oxide particles with the western hemlock-ligno-p-cresol carried thereon. This experiment proves that the western hemlock-ligno-p-cresol was obtained by neutralization of the 1N aqueous sodium hydroxide solution containing the recovered western hemlock-ligno-p-cresol. The experiment also proves that the titanium oxide particles used for carrying the lignin derivative was reusable after release of the lignin derivative.

Example 3

Separation of Lignophenol Derivative from Purification Solvent

A solution of 1 g of cypress/beech-ligno-p-cresol dissolved in 40 ml of acetone was added dropwise to 200 ml of diethyl ether with magnetic stirring to give beige precipitate. The cypress/beech-ligno-p-cresol was derived from acetone-defatted, dried Japanese cypress powder and acetone-defatted, dried beech powder. After removal of the beige precipitate, 5 g of the titanium oxide particles used in Example 1 was added to yellow supernatant (solution mixture of acetone and diethyl ether) at room temperature. Immediately after addition of the titanium oxide particles, yellow precipitate was formed, while the color of the supernatant was changed from yellow to colorless. The yellow precipitate was collected by centrifugation at 3500 rpm at the temperature of 5° C. Addition of 100 ml of a 1N aqueous sodium hydroxide solution to the yellow precipitate with stirring immediately changed the color of the solution from colorless to brown, while changing the color of the precipitate from yellow to white. This experiment proves that an acetone-diethyl ether soluble fraction of the cypress/beech-ligno-p-cresol was carried on the titanium oxide particles for separation and was recovered in the aqueous solution of sodium hydroxide.

Example 4

Separation of Lignophenol Derivative from Acetone Solution

Acetone-defatted, dried beech powder was used as the lignocellulose material. Beech-ligno-p-cresol was prepared by introducing p-cresol as the phenol compound into the lignin of the lignocellulose material. At room temperature, 1 g of the titanium oxide particles used in Example 1 was added to 50 ml of an acetone solution of the beech-ligno-p-cresol (5.0 g/L) with magnetic stirring. Immediately after the addition of the titanium oxide particles, yellow precipitate was formed with light brown supernatant. The precipitate was separated from the supernatant by centrifugation of the reaction liquid at 4000 rpm at the temperature of 5° C. Ultraviolet-visible spectroscopy of the supernatant determined that the concentration of the remaining ligno-p-cresol was 1.5 g/L. The yellow precipitate was collected by centrifugation at 3500 rpm at the temperature of 5° C. (collection rate: about 70%). Addition of 100 ml of a 1N aqueous sodium hydroxide solution to the collected precipitate with stirring changed the color of the aqueous solution from colorless to brown, while changing the color of the precipitate from yellow to white. This experiment proves that the beech-ligno-p-cresol was recovered in the aqueous solution of sodium hydroxide.

Example 5

Separation of Alkali-Treated Secondary Derivative from Acetone Solution

Acetone-defatted, dried Japanese cypress powder was used as the lignocellulose material. Cypress-ligno-p-cresol was prepared by introducing p-cresol as the phenol compound into the lignin of the lignocellulose material. The cypress-ligno-p-cresol was subjected to alkali treatment with an alkali liquid of 1N NaOH at 140° C. for one hour to give an alkali-treated cypress-ligno-p-cresol secondary derivative. Twenty titanium oxide electrodes (having an effective area of 0.25 cm$^2$ per 1 cm$^2$ of conductive glass) were soaked in 100 ml of an acetone solution of the secondary derivative (2.5 g/L). The titanium oxide electrode was obtained by firing a paste mixture (100:10:4) of HPA-15R/polyethylene glycol (molecular weight: approximately 20000)/titanium oxide particles (P25 manufactured by Nippon Aerosil Co., Ltd., average particle diameter: 25 nm (number-based particle diameter observed with TEM)) at 450° C. The soaking of the titanium oxide electrode in the acetone solution of the secondary derivative changed the surface of each titanium oxide electrode to yellow. After the soaking of the electrode, the concentration of the secondary derivative in the acetone solution was evaluated by ultraviolet-visible spectroscopy. The result of spectroscopy showed an approximately 10% decrease of the alkali-treated secondary derivative in the acetone solution by the twenty titanium oxide electrodes. Namely approximately 2% of the cypress-ligno-p-cresol was separated from the acetone solution to be carried on 1 $Cm^2$ of the titanium oxide electrode.

Example 6

Separation of Acetyl Group-Introduced Secondary Derivative from Acetone Solution Acetone-defatted, dried beech powder was used as the lignocellulose material. Beech-ligno-p-cresol was prepared by introducing p-cresol as the phenol compound into the lignin of the lignocellulose material. An acetyl group-introduced secondary derivative of the beech-ligno-p-cresol was prepared as an acetylated secondary derivative. At room temperature, a solution of the beech-ligno-p-cresol dissolved in 1.0 ml of pyridine was mixed with 1.0 ml of acetic anhydride with stirring and was stood still for 48 hours. The mixture was added dropwise to 40 ml of cold water with stirring to give precipitate. The dried precipitate was the acetylated secondary derivative.

Addition of 100.0 mg of the titanium oxide particles used in Example 1 to 5.0 ml of an acetone solution of the secondary derivative (4.0 g/L) formed yellowish white precipitate with decrease of the color of the acetone solution. At room temperature, 1 g of the titanium oxide particles used in Example 1 was added to 50 ml of an acetone solution of the secondary derivative (5.0 g/L) with magnetic stirring. Immediately after the addition of the titanium oxide particles, yellow precipitate was formed with light brown supernatant. Ultraviolet-visible spectroscopy of the supernatant determined that the concentration of the remaining ligno-p-cresol was 1.5 g/L. The yellow precipitate was collected by centrifugation at 3500 rpm at the temperature of 5° C. (collection rate: about 70%). Addition of 100 ml of a 1N aqueous sodium hydroxide solution to the collected precipitate with stirring changed the color of the aqueous solution from colorless to brown, while changing the color of the precipitate from yellow to white. This experiment proves that the beech-ligno-p-cresol was recovered in the aqueous solution of sodium hydroxide.

Example 7

Preparation of Secondary Derivative on Metal Oxide

At room temperature, a dispersion of 0.1 g of the precipitate obtained in Example 1 in 1.0 ml of pyridine was mixed with 1.0 ml of acetic anhydride with stirring and was stood still for 48 hours. The mixture was added dropwise to 40 ml of cold water with stirring to give precipitate. Infrared spectroscopy of 0.55 g of the dried precipitate showed absorption at 1740 cm−1 and absorption of hydrogen bonding in a range of 3300 cm−1 to 3400 cm−1. This experiment proves that the acetyl group was introduced into the lignophenol carried on the titanium oxide particles (deduced by hydrogen bonding). No elution of the lignophenol into pyridine was observed during acetylation. The precipitate was also added to acetone with stirring. No elution of the acetylated secondary derivative to acetone was observed.

The present application claims the priority from Japanese application P2005-167103 filed on Jun. 7, 2005, the contents of which are hereby incorporated by reference into this application.

INDUSTRIAL APPLICABILITY

The technique of the present invention is preferably applicable to effective use and recycle of lignocellulose resources.

What is claimed is:

1. A method for separating a lignin derivative, the method comprising:
    contacting the lignin derivative with a metal oxide in a liquid medium,
    separating the metal oxide carrying the lignin derivative from the liquid medium, and
    recovering the lignin derivative from the metal oxide under an alkali condition to prevent alkali degradation of the lignin derivative,
    wherein the lignin derivative has a 1,1-diphenylpropane unit and/or a unit derived from the 1,1-diphenylpropane unit.

2. The method as in claim 1, wherein the metal oxide is an oxide of one or more metals selected from the group consisting of titanium, zinc, iron, cobalt, nickel, copper, tin, indium, lead, and niobium.

3. The method as in claim 2, wherein the metal oxide comprises a titanium oxide.

4. The method as in claim 1, wherein the metal oxide comprises a semiconductor material.

5. The method as in claim 1, wherein the metal oxide comprises the metal oxide particle of average particle size less than or equal to 300 nm.

6. The method as in claim 1, wherein the liquid medium is selected from the group consisting of an aqueous medium, a non-aqueous medium and mixture thereof.

7. The method as in claim 1, wherein the lignin derivative is dissolved or dispersed in the liquid medium.

8. The method as in claim 1, wherein the lignin derivative is one or more lignin derivatives selected from the group consisting of following (a) to (d):
    (a) a ligno-phenol derivative which is a phenol-derivative of lignin, the ligno-phenol derivative obtainable by solvating a lignin containing material with a phenol compound and then mixing the solvated lignin containing material with an acid;
    (b) a secondary derivative obtainable by modifying the ligno-phenol derivative with a functional group selected from the group consisting of an acyl group, a carboxy group, an amido group, and a cross-linking group;
    (c) a secondary derivative obtainable by treating the ligno-phenol derivative with an alkali; and
    (d) a higher order derivative obtainable by modifying the ligno-phenol derivative with at least two modifications selected from the following modifications:
        introduction of an acyl group, introduction of a carboxy group, introduction of an amido group, introduction of a cross-linking group and an alkali-treatment.

9. The method as in claim 8, the lignin derivative comprises the lignin derivative (a).

10. The method as in claim 8, the lignin derivative comprises the lignin derivative (b).

11. The method as in claim 8, the lignin derivative comprises the lignin derivative (c).

12. The method as in claim 1, wherein the recovering is performed at a temperature of less than or equal to 60° C.

13. A method for producing a lignin derivative comprising:
    contacting the lignin derivative with a metal oxide in a liquid medium,
    separating the metal oxide carrying the lignin derivative from the liquid medium, and
    recovering the lignin derivative from the metal oxide under an alkali condition to prevent alkali degradation of the lignin derivative,
    wherein the lignin derivative has a 1,1-diphenylpropane unit and/or a unit derived from the 1,1-diphenylpropane unit.

14. The method as in claim 13, wherein the lignin derivative is a ligno-phenol derivative of a lignin obtainable by solvating a lignin containing material with a phenol compound and then mixing the solvated lignin containing material with an acid; and during the separation step the ligno-phenol derivative is contacted with the metal oxide added to the liquid medium prior to the formation of the ligno-phenol derivative.

15. The method as in claim 13, wherein the lignin derivative is a ligno-phenol derivative of a lignin obtainable by solvating a lignin containing material with a phenol compound and then mixing the solvated lignin containing material with an acid; and during the separation step the ligno-phenol derivative is contacted with the metal oxide added to the liquid medium after the formation of the ligno-phenol derivative.

16. A method of purifying a lignin derivative, the method comprising:
    contacting the lignin derivative with a metal oxide in a liquid medium,
    separating the metal oxide carrying the lignin derivative from the liquid medium, and
    recovering the lignin derivative from the metal oxide under an alkali condition to prevent alkali degradation of the lignin derivative,
    wherein the lignin derivative has a 1,1-diphenylpropane unit and/or a unit derived from the 1,1-diphenylpropane unit.

17. A method for recovering a lignin derivative from a composite material containing thereof, the method comprising:
    contacting the lignin derivative with a metal oxide in a liquid medium
    separating the metal oxide carrying the lignin derivative from the liquid medium, and
    recovering the lignin derivative from the metal oxide under an alkali condition to prevent alkali degradation of the lignin derivative,
    wherein the lignin derivative has a 1,1-diphenylpropane unit and/or a unit derived from the 1,1-diphenylpropane unit.

18. The method as in claim 17, wherein the composite material comprises a used product.

\* \* \* \* \*